(12) United States Patent
Koga

(10) Patent No.: US 10,815,407 B2
(45) Date of Patent: Oct. 27, 2020

(54) RUBBER COMPOSITION AND SEALING PART FOR HIGH PRESSURE HYDROGEN APPARATUS USING SAME

(71) Applicant: NOK CORPORATION, Tokyo (JP)

(72) Inventor: Atsushi Koga, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 79 days.

(21) Appl. No.: 16/106,398

(22) Filed: Aug. 21, 2018

(65) Prior Publication Data

US 2018/0355232 A1  Dec. 13, 2018

Related U.S. Application Data

(63) Continuation of application No. PCT/JP2017/011919, filed on Mar. 24, 2017.

(30) Foreign Application Priority Data

Mar. 28, 2016 (JP) .................................. 2016-064574

(51) Int. Cl.
| | |
|---|---|
| *C09K 3/10* | (2006.01) |
| *C08L 23/08* | (2006.01) |
| *C08F 210/08* | (2006.01) |
| *C08F 210/16* | (2006.01) |
| *C08F 236/20* | (2006.01) |
| *F16J 15/02* | (2006.01) |
| *C08F 210/18* | (2006.01) |
| *C08F 236/04* | (2006.01) |

(52) U.S. Cl.
CPC .............. *C09K 3/10* (2013.01); *C08F 210/08* (2013.01); *C08F 210/18* (2013.01); *C08F 236/045* (2013.01); *C08L 23/08* (2013.01); *C09K 3/1006* (2013.01); *F16J 15/022* (2013.01); *C09K 2200/0642* (2013.01)

(58) Field of Classification Search
USPC ....................................................... 525/332.1
See application file for complete search history.

(56) References Cited

U.S. PATENT DOCUMENTS

| | | | | |
|---|---|---|---|---|
| 4,588,794 A | * | 5/1986 | Oda ....................... | C08F 210/18 525/332.1 |
| 6,410,650 B1 | | 6/2002 | Koda et al. | |
| 2016/0347894 A1 | | 12/2016 | Endo et al. | |

FOREIGN PATENT DOCUMENTS

| | | | | |
|---|---|---|---|---|
| CN | 1207106 A | 2/1999 | | |
| CN | 102504727 A | 6/2012 | | |
| EP | 1 088 836 A1 | 4/2001 | | |
| JP | 2000-072936 A | 3/2000 | | |
| JP | 2004-256803 A | * | 9/2004 | ............ C08F 210/18 |
| JP | 2011-213822 A | 3/2010 | | |
| JP | 2015-206002 A | 11/2015 | | |
| WO | 2015/122415 A1 | 8/2015 | | |

OTHER PUBLICATIONS

Online English language translation of Detailed Description of JP 2004-256803 A; publication date: Sep. 16, 2004 (Year: 2004).*
Chinese Office Action dated Sep. 19, 2019 for corresponding Chinese Application No. 201780013749.1 and English translation.
English translation of Written Opinion for corresponding International Application No. PCT/JP2017/011919 dated Apr. 18, 2017.
International Preliminary Report on Patentability for corresponding International Application No. PCT/JP2017/011919 dated Oct. 2, 2018.
Chinese Office Action dated Jun. 14, 2019 for corresponding Chinese Application No. 201780013749.1 and English translation.
Chen Nan-hoon et al., "Physico-chemical Analysis Testing refers to Analytical Technology of Metal materials in South Africa", China National Defense Industry Press, Dec. 1988, p. 84.
Extended European Search Report dated Sep. 19, 2019 for corresponding European Application No. 17774726.8.
Korean Office Action dated Oct. 8, 2019 for corresponding Korean Application No. 10-2018-7026255 and English translation.
Chinese Office Action dated Dec. 28, 2018 for corresponding Chinese Application No. 201780013749.1 and English translation.
Koga et al., "A Visualizing Study of Blister Fracture in Rubber O-rings", Journal of the Society of Rubber Science and Technology, Japan vol. 85, No. 5, pp. 162-167 (2012).
International Search Report for corresponding International Application No. PCT/JP2017/011919 dated Apr. 18, 2017.
Written Opinion for corresponding International Application No. PCT/JP2017/011919 dated Apr. 18, 2017.
Decision to Grant dated Aug. 21, 2017 for corresponding Japanese Application 2017-529847 and English translation.
Korean Notice of Final Rejection dated Apr. 27, 2020 in the corresponding Korean application No. 10-2018-7026255 and English translation.

\* cited by examiner

*Primary Examiner* — Fred M Teskin
(74) *Attorney, Agent, or Firm* — Pearne & Gordon LLP

(57) ABSTRACT

A rubber composition is, in particular, suitable for producing a sealing part for a high pressure hydrogen apparatus having excellent low temperature sealing properties and blister resistance, and the sealing part for a high pressure hydrogen apparatus is obtained by using the rubber composition.
A rubber composition includes an ethylene/butene/ethylidene norbornene terpolymer (EBENB), and the rubber composition is for use in producing a sealing part for a high pressure hydrogen apparatus.

8 Claims, No Drawings

RUBBER COMPOSITION AND SEALING PART FOR HIGH PRESSURE HYDROGEN APPARATUS USING SAME

CROSS REFERENCE TO RELATED APPLICATIONS

The present application is a continuation application of International Patent Application No. PCT/JP2017/011919 filed on Mar. 24, 2017, which claims priority to Japanese Patent Application No. 2016-064574, filed on Mar. 28, 2016. The contents of these applications are incorporated herein by reference in their entirety.

BACKGROUND

Technical Field

The present disclosure relates to a rubber composition and a sealing part for a high pressure hydrogen apparatus using the same. Particularly, the present disclosure relates to a rubber composition suitable for producing a sealing part for a high pressure hydrogen apparatus used under an environment at a low temperature (for example, about −40° C. to −60° C.).

Background Art

Fuel cell vehicles using a fuel cell system, which generates electricity from hydrogen and oxygen, have become widespread in recent years. A high pressure hydrogen gas at a pressure level of 70 MPa is used in a high pressure tank carried on a fuel cell vehicle, in order that such fuel cell vehicles realize a long cruising range equivalent to that of gasoline-powered vehicles. In a hydrogen station for filling such a high pressure tank carried on a vehicle with a compressed hydrogen gas, a high pressure hydrogen gas at a pressure level of 90 MPa is used.

Furthermore, it is necessary to fill a high pressure tank carried on a vehicle with a hydrogen gas rapidly if the target of the time taken to fill a high pressure tank with a high pressure hydrogen gas is set to around three minutes, which is equivalent to the time taken to fill a tank carried on a gasoline-powered vehicle with gasoline. On this occasion, the temperature of the high pressure tank carried on a vehicle increases due to adiabatic expansion of the gas, which is problematic. Therefore, it is common to use a low temperature hydrogen gas which has been cooled to around −40° C. in advance, in order to prevent temperature increase of the high pressure tank carried on a vehicle.

A sealing part capable of sealing a high pressure hydrogen gas at −40° C. is essential for such a fuel cell vehicle. Furthermore, a sealing part capable of exerting the sealing function even at −50° C. is also needed on the assumption that a fuel cell vehicle might be used in a cold climate.

On the other hand, for a sealing part for gas-sealing, rubber materials using a nitrile rubber (NBR), a fluororubber (FKM), a butyl rubber (IIR), or the like have been conventionally and widely used. However, it cannot be said that these materials have the sufficient sealing function under the low temperature environment described above, and therefore there is the fear of the occurrence of leakage due to an insufficiency of low temperature sealing properties.

In contrast, an ethylene/propylene/diene terpolymer (EPDM) is widely known as a rubber material capable of exerting sealing properties even at a low temperature. A rubber composition using an EPDM has already been used for a sealing part for a high pressure hydrogen apparatus due to its excellent low temperature sealing properties (Japanese Patent Application Publication No. 2015-206002).

In addition, properties of a sealing part for a high pressure hydrogen apparatus have needed to be further improved recently, and particularly improvement in blister resistance thereof has been required. Blister resistance of a sealing part for a high pressure hydrogen apparatus herein means the properties of forming no blisters (such as cracks and foam) when the sealing part is brought into contact with high pressure hydrogen. Formation of such a blister is a cause of rubber destruction and is therefore undesirable.

It is known that there is a correlation between rubber destruction caused by a blister and particularly a hydrogen gas diffusion coefficient of a sealing part (for example, "A Visualizing Study of Blister Fracture in Rubber O-rings", JOURNAL OF THE SOCIETY OF RUBBER SCIENCE AND TECHNOLOGY, JAPAN Vol. 85, No. 5, pp. 162-167 (2012)). When a sealing part is brought into contact with a high pressure hydrogen gas, a little amount of the hydrogen gas permeates the inner part the sealing part. In cases where the hydrogen gas rapidly diffuse in the inner part of the sealing part (i.e., the diffusion coefficient is large), rubber destruction is less likely to occur.

On the other hand, when a hydrogen gas permeates the inner part of a sealing part for a high pressure hydrogen apparatus using a conventional EPDM, the hydrogen gas is unlikely to diffuse (i.e., the hydrogen gas diffusion coefficient is small), and thus, sufficient blister resistance has not been attained yet.

SUMMARY

Accordingly, the present disclosure provides a rubber composition, in particular, suitable for producing a sealing part for a high pressure hydrogen apparatus having excellent low temperature sealing properties and blister resistance, and a sealing part for a high pressure hydrogen apparatus using the same.

Solution to Problem

As a result of intensive studies, the inventors have focused on the fact that an ethylene/butene/ethylidene norbornene terpolymer (EBENB) has excellent low temperature sealing properties, and have found that a rubber composition suitable for producing a sealing part for a high pressure hydrogen apparatus having both of excellent low temperature sealing properties and excellent blister resistance can be obtained by using an EBENB in place of a conventional EPDM, thus completing the present disclosure.

Specifically, embodiments of the present disclosure are as follows:

[1] A rubber composition comprising an ethylene/butene/ethylidene norbornene terpolymer (EBENB), the rubber composition being for use in producing a sealing part for a high pressure hydrogen apparatus.

[2] The rubber composition according to [1], wherein an iodine value of the ethylene/butene/ethylidene norbornene terpolymer is 3 to 20.

[3] The rubber composition according to [1], wherein the sealing part for a high pressure hydrogen apparatus has low temperature sealing properties at −50° C.

[4] The rubber composition according to [2], wherein the sealing part for a high pressure hydrogen apparatus has low temperature sealing properties at −50° C.

[5] A sealing part for a high pressure hydrogen apparatus, obtained by vulcanization and molding of the rubber composition according to [1], wherein
a TR 10 value as determined by a low temperature retraction test according to JIS K6261: 2006 is −50° C. or lower, and
a hydrogen gas diffusion coefficient is $5 \times 10^{-6}$ cm$^2$/s or more.

[6] A sealing part for a high pressure hydrogen apparatus, obtained by vulcanization and molding of the rubber composition according to [2], wherein
a TR 10 value as determined by a low temperature retraction test according to JIS K6261: 2006 is −50° C. or lower, and
a hydrogen gas diffusion coefficient is $5 \times 10^{-6}$ cm$^2$/s or more.

[7] A sealing part for a high pressure hydrogen apparatus, obtained by vulcanization and molding of the rubber composition according to [3], wherein
a TR 10 value as determined by a low temperature retraction test according to JIS K6261: 2006 is −50° C. or lower, and
a hydrogen gas diffusion coefficient is $5 \times 10^{-6}$ cm$^2$/s or more.

[8] A sealing part for a high pressure hydrogen apparatus, obtained by vulcanization and molding of the rubber composition according to [4], wherein
a TR 10 value as determined by a low temperature retraction test according to JIS K6261: 2006 is −50° C. or lower, and
a hydrogen gas diffusion coefficient is $5 \times 10^{-6}$ cm$^2$/s or more.

[9] A method for producing a sealing part for a high pressure hydrogen apparatus, comprising using a rubber composition comprising an ethylene/butene/ethylidene norbornene terpolymer (EBENB) as a material.

[10] The method for producing a sealing part for a high pressure hydrogen apparatus according to [9], wherein an iodine value of the ethylene/butene/ethylidene norbornene terpolymer is 3 to 20.

[11] The method for producing a sealing part for a high pressure hydrogen apparatus composition according to [9], wherein the sealing part for a high pressure hydrogen apparatus has low temperature sealing properties at −50° C.

[12] The method for producing a sealing part for a high pressure hydrogen apparatus composition according to [10], wherein the sealing part for a high pressure hydrogen apparatus has low temperature sealing properties at −50° C.

According to the rubber composition of the present disclosure, a sealing part for a high pressure hydrogen apparatus having excellent low temperature sealing properties and blister resistance can be obtained.

DESCRIPTION OF EMBODIMENTS

Hereinafter, embodiments of the rubber composition according to the present disclosure will be described in detail.

The rubber composition according to the present embodiment comprises an ethylene/butene/ethylidene norbornene terpolymer (EBENB). In addition, it is preferable that the rubber composition further comprise a filler, a crosslinker, and a processing aid. The rubber composition may further comprise various compounding agents, if needed.

Conventionally, EPDMs have been widely used as a material having low temperature sealing properties, but rubber compositions using an EPDM tend to result in higher production costs than rubber compositions using another rubber material due to material costs and fabricability. Therefore, the inventors have focused on EBENBs, which have excellent cold resistance and flexibility, and conducted studies. As a result, the inventors have found that a sealing part for a high pressure hydrogen apparatus obtained by using an EBENB also has low temperature sealing properties equivalent to or higher than that of a sealing part obtained by using an EPDM and furthermore, is excellent in fabricability as a rubber composition due to flexibility thereof. Moreover, the inventors have also found that a sealing part for a high pressure hydrogen apparatus obtained by using an EBENB particularly allows a hydrogen gas to diffuse quickly (in other words, has a large hydrogen gas diffusion coefficient) and also has excellent blister resistance.

According to the rubber composition according to the present disclosure, which has been completed through the studies as described above, a sealing part for a high pressure hydrogen apparatus can be produced that has desirable sealing properties required of a sealing part for a high pressure hydrogen apparatus, particularly, both of excellent low temperature sealing properties and blister resistance.

As the EBENB, any of copolymerized products prepared from ethylene, butene, and a small amount of any of various ethylidene norbornene components can be used, and various commercially available EBENBs as such can be used practically.

An iodine value (g/100 g) of the EBENB is preferably 3 to 20, more preferably 5 to 18. The EBENB with an iodine value within such a range can be maintain a stable molecular state even under a low temperature environment to thereby result in improvement in low temperature sealing properties and also has improved mechanical strength to thereby result in improvement in blister resistance.

It can also be said that EBENBs have a small polymer viscosity represented by Mooney viscosity (ML$_{1+4}$, 100° C.) and is therefore excellent in terms of fabricability (e.g., kneading properties and moldability) compared to EPDMs. Thus, productivity including the efficiency of molding is improved by using an EBENB in place of an EPDM, which consequently leads to reduction in production costs.

The Mooney viscosity (ML$_{1+4}$, 100° C.) of the EBENB is preferably 10 to 45, more preferably 15 to 25. If the Mooney viscosity is too small, the compression permanent stress may increase to result in a decreased tensile strength. In contrast, if the Mooney viscosity is too large, the properties are improved but fabricability may decrease. The Mooney viscosity (ML$_{1+4}$, 100° C.) can be determined according to the provisions of JIS K6300-1: 2013.

The content of the ethylene component in the EBENB is preferably 60 to 80 mass %, more preferably 65 to 75 mass %. When the content is set in the range described above, the EBENB has the lowest glass transition temperature to thereby improve cold resistance.

The content of the EBENB in the rubber composition according to the present embodiment is preferably 1 to 100 parts by weight, more preferably 50 to 100 parts by weight, even more preferably 70 to 100 parts by weight. When the content of the EBENB is set in the range above described, improvements in fabricability and productivity are expected.

As the filler, any of those conventionally known can be used. Specific examples thereof include inorganic fillers such as carbon black, silicic acid, silicates, calcium carbonate, magnesium carbonate, clay, talc, bentonite, sericite, mica, calcium silicate, alumina hydrate, and barium sulfate, and organic fillers such as a polyethylene resin, a polypropylene resin, a styrene resin, a coumarone-indene resin, a melamine resin, a phenol resin, and a cork powder, and these can be used singly or in combination. Among these, carbon black is preferred as the filler.

The amount of the filler incorporated is preferably 0.1 to 300 parts by weight based on 100 parts by weight of the EBENB. However, some fillers can be incorporated even in the amount out of the range described above, according to the kind thereof. The kind and the amount of the filler may be arbitrarily determined according to the aim thereof.

As the crosslinker, an organic peroxide is mostly preferred. Examples of the organic peroxide include t-butyl peroxide, dicumyl peroxide, 2,5-dimethyl-2,5-di-t-butylperoxyhexane, 2,5-dimethyl-2,5-di-t-butyl peroxyhexin-3, t-butylcumyl peroxide, 1,3-di-t-butylperoxyisopropylbenzene, 2,5-dimethyl-2,5-dibenzoylperoxyhexane, t-butylperoxybenzoate, t-butylperoxyisopropylcarbonate, and n-butyl-4,4-di-t-butylperoxyvalerate.

The amount of the crosslinker incorporated is preferably 0.5 to 10 parts by weight, more preferably 1 to 5 parts by weight, based on 100 parts by weight of the EBENB. When the amount is set in the range described above, failure in molding due to foaming upon vulcanization can be prevented and a favorable crosslink density also can be provided, which results in a tendency to easily obtain a product having sufficient physical properties.

A masterbatch containing an organic peroxide described above can also be used, including DCP30ZP03K (a masterbatch manufactured by ZEON CORPORATION; 30 mass % of dicumyl peroxide, 30 mass % of Zetpol 2010 L, 40 mass % of SRF carbon black). Such a masterbatch is preferred because it can improve kneading properties and dispersibility when the rubber composition is prepared.

The rubber composition may further comprise a crosslinking promoter, if needed. As the crosslinking promoter, triallyl isocyanurate (TAIC), triallyl cyanate (TAC), liquid polybutadiene, N, N'-m-phenylenedimaleimide, trimethylolpropane trimethacrylate, or the like can be used. When an adequate amount of the crosslinking promoter is added and incorporated, the crosslinking efficiency can be improved, and heat resistance and mechanical properties can also be improved to thereby result in improvement in stability of a sealing part as well.

Examples of the processing aid include a process oil containing an aliphatic hydrocarbon as a main component, such as PW380 and PW220, which are products manufactured by Idemitsu Kosan Co., Ltd., and these can be used singly or in combination. Particularly, the process oil is a lower molecule than a paraffin wax, which has a similar chemical structure to the process oil, and therefore the process oil is preferred because it exhibits a characteristic effect which cannot be achieved when a paraffin wax is incorporated.

The amount of the processing aid incorporated is preferably 1 to 20 parts by weight, more preferably 3 to 15 parts by weight, based on 100 parts by weight of the EBENB. When the amount of the processing aid is set in the range above described, fabricability upon kneading is enhanced, and occurrence of oil bleeding and the like can also be prevented.

In the rubber composition according to the present embodiment, compounding agents generally used in rubber industry, such as an acid acceptor and an antioxidant, can be appropriately added and used as a rubber compounding agent, if needed, in addition to the components described above. The amount of the rubber compounding agent incorporated is preferably 300 parts by weight or less based on 100 parts by weight of the EBENB.

Preparation of the rubber composition can be conducted by kneading the various materials using a kneading machine such as a single screw extruder, a twin screw extruder, a roll mill, a Banbury mixer, a kneader, or a high shear mixer.

For vulcanization of the rubber composition, vulcanization can be conducted under pressure generally at about 150 to 230° C. for about 0.5 to 30 minutes using an injection molding machine, a compression molding machine, or the like. After carrying out such vulcanization as primary vulcanization, secondary vulcanization may be conducted, if needed, in order to securely vulcanize the inner part of the vulcanizate. The secondary vulcanization can be conducted generally by heating in an oven at about 150 to 250° C. for about 0.5 to 24 hours.

A product (molded article) obtained by vulcanizing and molding the rubber composition according to the present disclosure is suitable as a sealing part for a high pressure hydrogen apparatus. Examples of the high pressure hydrogen apparatus herein include a container, pipework and the like used for containing or transporting a high pressure hydrogen gas, such as an in-vehicle tank for a fuel-cell vehicle, a tank for a hydrogen filling station, and other various hydrogen gas tanks.

The sealing part for a high pressure hydrogen apparatus described above is a part used for sealing a hydrogen gas in the high pressure hydrogen apparatus. The sealing part for a high pressure hydrogen apparatus exhibits excellent sealing properties even under an environment at a low temperature (for example, about −40 to 60° C.), and is particularly suitable for use under an environment at −50° C. or lower. For example, the sealing part for a high pressure hydrogen apparatus preferably has a TR 10 value of −50° C. or lower as determined by a low temperature retraction test according to JIS K6261: 2006. The above described sealing part for a high pressure hydrogen apparatus preferably allows a hydrogen gas to diffuse quickly, and specifically, a hydrogen gas diffusion coefficient is preferably $5 \times 10^{-6}$ cm$^2$/s or more, for example.

The shape of the sealing part for a high pressure hydrogen apparatus is not particularly limited and may have any of various shapes according to its application, and examples thereof include a form of an O-ring, packing, and a sheet.

The embodiments of the present disclosure have been described hereinbefore. However, the present disclosure is not limited to the embodiments described above and encompasses any embodiments included in the spirit of the present disclosure and the claims, and therefore various modifications may be made within the scope of the present disclosure.

EXAMPLES

Examples and Comparative Examples will be hereinafter described for further clarity of the effect of the present disclosure, but the present disclosure is not limited to Examples.

Example 1

In Example 1, 70 parts by weight of a carbon black, 3 parts by weight of a peroxide crosslinker, 5 parts by weight of zinc oxide, 1 part by weight of stearic acid, and an adequate amount of a processing aid and an antioxidant, if needed, were added to 100 parts by weight of an EBENB having an iodine value of 16 (an experimentally synthesized product), and the resultant was kneaded with a kneader and an open roll mill to obtain a rubber composition.

Example 2

In Example 2, a rubber composition was obtained in the same manner as in Example 1 except that an EBENB having an iodine value of 10 (an experimentally synthesized product) was used.

Example 3

In Example 3, a rubber composition was obtained in the same manner as in Example 1 except that an EBENB having an iodine value of 5 (an experimentally synthesized product) was used.

Comparative Example 1

In Comparative Example 1, a rubber composition was obtained in the same manner as in Example 1 except that an EPDM having an iodine value of 16 (an experimentally synthesized product) was used.

Comparative Example 2

In Comparative Example 2, a rubber composition was obtained in the same manner as in Example 1 except that an EPDM having an iodine value of 26 (an experimentally synthesized product) was used.

[Evaluations]

Evaluations of properties of the rubber compositions according to Examples and Comparative Examples above were conducted as described below. The conditions of the evaluations of each property were as follows. The results are shown in Table 1.

[1] Low Temperature Retraction Test (Low Temperature Sealing Properties)

The above described rubber composition was subjected to vulcanization under pressure at 180° C. for 8 minutes (primary vulcanization) and open vulcanization at 180° C. for 24 hours (secondary vulcanization) using a mold for forming a sheet, to thereby mold a vulcanized rubber plate having a thickness of 2 mm.

TR 10 and TR 70 of the vulcanized rubber plate obtained was determined according to PS K6261: 2006. FR 10 and TR 70 are the temperatures at which the retraction is 10% and 70%, respectively, when a sample was frozen with 50% elongation, followed by temperature rising to recover the elastic modulus of the sample. The lower temperatures of TR 10 and TR 70 indicate that the rubber elasticity recovers at a lower temperature, and it is preferable for a sealing part, which exhibits sealing properties by the rubber elasticity, that these temperatures are lower. A smaller difference between these temperatures indicates that the elastic recovery arises from a smaller temperature rising, and it is understood that such a material exhibits a favorable sealing behavior in view of the rubber elasticity.

Specifically, in Examples, the case where TR 10 was −50° C. or less was rated as good low temperature sealing properties.

[2] Compression Set Test (Heat Resistance)

The above described rubber composition was subjected to vulcanization under pressure at 180° C. for 10 minutes (primary vulcanization) and open vulcanization at 150° C. for 24 hours (secondary vulcanization) using a mold for forming O-ring, to thereby obtain an O-ring according to JIS B2401-1: 2012 G25.

The compression set (%) of the O-ring obtained was determined after heat-aging under conditions of a compression rate of 25%, a test temperature of 150° C., and test duration of 70 hours, according to JIS K6262: 2006. A smaller value of the compression set of the O-ring means better sealing properties and a longer sealing life of the O-ring.

[3] Gas Permeability Test (Gas Barrier Properties and Blister Resistance)

The above described rubber composition was subjected to vulcanization under pressure at 180° C. for 8 minutes (primary vulcanization) and open vulcanization at 150° C. for 24 hours (secondary vulcanization) using a mold for forming a sheet, to thereby mold a vulcanized rubber plate having a thickness of 0.5 mm.

Then, the hydrogen gas permeability coefficient and the hydrogen gas diffusion coefficient at 30° C. and 0.6 MPa of the vulcanized rubber plate obtained were calculated according to JIS K6275-1: 2009. The hydrogen gas permeability coefficient is a measure of the easiness of hydrogen gas permeation in a rubber material, and a larger value thereof indicates that the more hydrogen permeates the rubber material. The hydrogen gas diffusion coefficient is a measure of the easiness of hydrogen gas diffusion in a rubber material, and a larger value thereof indicates that a hydrogen gas diffuses in the rubber material more easily.

Specifically, in Examples, the case where the hydrogen gas diffusion coefficient was $5\times10^{-6}$ cm$^-$ is or more was rated as good in terms of blister resistance of the rubber composition.

[4] Cycle Test Under Pressure (Sealing Durability)

The above described rubber composition was subjected to vulcanization under pressure at 180° C. for 10 minutes (primary vulcanization) and open vulcanization at 150° C. for 24 hours (secondary vulcanization) using a mold for forming O-ring, to thereby obtain an O-ring according to JIS B2401-1:2012 G25.

A pressure container with the O-ring obtained was filled with a high pressure hydrogen gas to increase the inner pressure of the container to 90 MPa, and the inner pressure was kept for certain duration. Then the inner pressure of the container was reduced to 0.6 MPa, and kept for certain duration. Such a pressure cycle of pressurization and pressure reduction (1 cycle: 6 seconds) was conducted 5500 times (at 30° C.), and it was observed whether no striking leakage occurred during the cycles. No leakage means that the O-ring is excellent in sealing durability.

TABLE 1

| | | Example 1 | Example 2 | Example 3 | Comparative Example 1 | Comparative Example 2 |
|---|---|---|---|---|---|---|
| Polymer | | EBENB | EBENB | EBENB | *EPDM* | *EPDM* |
| Iodine Value [g/100 g] | | 16 | 10 | 5 | 16 | 26 |
| Evaluations of Properties | Low temperature Sealing Properties — TR10 [° C.] | −51 | −53 | −55 | *−47* | *−47* |
| | TR70 [° C.] | −35 | −35 | −30 | −30 | −30 |
| | |TR10 − TR70| [° C.] | 16 | 18 | 25 | 17 | 17 |
| | Heat Resistance — Compression Set [%] | 23 | 23 | 23 | 22 | 25 |
| | Gas Barrier Properties — Hydrogen Gas Permeability Coefficient [(cm$^3$(STP) · cm)/(cm$^2$ · s · Pa)] | 2.4E−12 | 2.7E−12 | 2.7E−12 | 2.3E−12 | 2.3E−12 |
| | Blister Resistance — Hydrogen Gas Diffusion Coefficient [cm$^2$/s] | 5.2E−06 | 6.9E−06 | 6.4E−06 | *4.3E−06* | *4.1E−06* |
| | Sealing Durability — Occurrence of Leakage | None | None | None | None | None |

Note:
Bold italics in Table indicate that the material was out of the proper range for the present disclosure or that the result of the evaluation fell short of the acceptance level of Examples.
STP: Standard Temperature and Pressure As indicated in Table 1, it was confirmed that the rubber compositions comprising a EBENB according to the present disclosure (Examples 1 to 3) had desirable sealing properties for a sealing part for a high pressure hydrogen apparatus, and particularly, also had both of improved low temperature sealing properties and blister resistance compared to conventional rubber compositions using an EPDM (Comparative Examples 1 and 2).

Particularly, it was confirmed that molded articles made of the rubber composition comprising an EBENB according to Examples 1 to 3 provided a result of a lower temperature as TR 10 and thus had better low temperature sealing properties, than molded articles made of the rubber composition using an EPDM in place of an EBENB according to Comparative Examples 1 and 2.

It was also confirmed that molded articles using the rubber composition comprising an EBENB according to Examples 1 to 3 had an equivalent compression set to that of molded articles made of the rubber composition using an EPDM according to Comparative Examples 1 and 2 and thus had sufficient heat resistance (sealing life).

It was also confirmed that molded articles using the rubber composition comprising an EBENB according to Examples 1 to 3 had an equivalent hydrogen gas permeability coefficient and therefore equivalent gas barrier properties to those of molded articles made of the rubber composition using an EPDM according to Comparative Examples 1 and 2.

It was also confirmed that molded articles using the rubber composition comprising an EBENB according to Examples 1 to 3 had a larger hydrogen gas permeability coefficient than that of molded articles made of the rubber composition using an EPDM according to Comparative Examples 1 and 2, and thus allow to a hydrogen gas to diffuse more quickly.

Furthermore, molded articles using the rubber composition comprising an EBENB according to Examples 1 to 3 as well as molded articles made of the rubber composition comprising an EPDM according to Comparative Examples 1 and 2 caused no leakage, and thus it was confirmed that both had equivalent sealing durability to each other.

As is seen from the above, it was confirmed that the rubber composition comprising an EBENB according to the present disclosure was suitable for producing a sealing part for a high pressure hydrogen apparatus particularly having excellent low temperature sealing properties and blister resistance.

What is claimed is:

1. A sealing part for a high pressure hydrogen apparatus, the sealing part comprising a rubber composition, the rubber composition comprising an ethylene/butene/ethylidene norbornene terpolymer (EBENB), wherein an iodine value of the ethylene/butene/ethylidene norbornene terpolymer is 3 g/100 g to 20 g/100 g and the ethylene component in the ethylene/butene/ethylidene norbornene terpolymer is 60 to 80 mass %.

2. The sealing part according to claim 1, wherein an iodine value of the ethylene/butene/ethylidene norbornene terpolymer is 3 to 205 g/100 g to 18 g/100 g.

3. The sealing part according to claim 1, wherein the sealing part for a high pressure hydrogen apparatus has low temperature sealing properties at −50° C.

4. The sealing part according to claim 2, wherein the sealing part for a high pressure hydrogen apparatus has low temperature sealing properties at −50° C.

5. The sealing part according to claim 1, obtained by vulcanization and molding of the rubber composition, wherein
a TR 10 value as determined by a low temperature retraction test according to JIS K6261: 2006 is −50° C. or lower, and
a hydrogen gas diffusion coefficient is 5×10$^{-6}$ cm$^2$/s or more.

6. The sealing part according to claim 2, obtained by vulcanization and molding of the rubber composition, wherein
a TR 10 value as determined by a low temperature retraction test according to JIS K6261: 2006 is −50° C. or lower, and
a hydrogen gas diffusion coefficient is 5×10$^{-6}$ cm$^2$/s or more.

7. The sealing part according to claim 3, obtained by vulcanization and molding of the rubber composition, wherein
a TR 10 value as determined by a low temperature retraction test according to JIS K6261: 2006 is −50° C. or lower, and
a hydrogen gas diffusion coefficient is 5×10$^{-6}$ cm$^2$/s or more.

8. The sealing part according to claim 4, obtained by vulcanization and molding of the rubber composition, wherein a TR 10 value as determined by a low temperature retraction test according to JIS K6261: 2006 is −50° C. or lower, and a hydrogen gas diffusion coefficient is $5\times10^{-6}$ cm$^2$/s or more.

* * * * *